United States Patent [19]

Roach

[11] Patent Number: 5,083,837
[45] Date of Patent: Jan. 28, 1992

[54] SAFETY SHIELD FOR CHILD RESTRAINT SEAT

[76] Inventor: Beulah Roach, 6216 Dixon Dr., Raleigh, N.C. 27609

[21] Appl. No.: 591,241

[22] Filed: Oct. 1, 1990

[51] Int. Cl.⁵ .............................................. A47C 7/00
[52] U.S. Cl. .................................... 297/184; 297/217; 297/188
[58] Field of Search ............... 297/184, 186, 216, 487, 297/250, 217; 135/96

[56] References Cited

U.S. PATENT DOCUMENTS

| | | | |
|---|---|---|---|
| 2,109,881 | 3/1938 | Goldberg | 297/184 X |
| 4,086,674 | 5/1978 | Chiaradonna | 135/96 X |
| 4,275,921 | 6/1981 | Genin | 297/184 |
| 4,314,727 | 2/1982 | Potts | 297/184 |
| 4,579,385 | 4/1986 | Koenig | 297/184 |
| 4,583,780 | 4/1986 | Finn | 297/184 |
| 4,790,593 | 12/1988 | Davalos et al. | 297/250 |
| 4,813,739 | 3/1989 | Miller | 297/184 |

Primary Examiner—Laurie K. Cranmer
Assistant Examiner—Milton Nelson, Jr.
Attorney, Agent, or Firm—Rhodes, Coats & Bennett

[57] ABSTRACT

A safety shield that is adapted to be mounted about a top portion of a child restraint seat is shown. The safety shield comprises an outer transparent shield and an outer sun shield with the inner sun shield being moveable from a retracted position to an operative extended position. When mounted on the child restraint seat, the safety shield forms an open structure that generally surrounds the upper portion of the child restraint seat and protects the child.

4 Claims, 3 Drawing Sheets

SAFETY SHIELD FOR CHILD RESTRAINT SEAT

BACKGROUND OF THE INVENTION

Child restraint seats are very valuable in holding and securing a child within a vehicle. In fact, child restraint seats are by law mandatory in many states. While child restraint seats have been very useful in protecting infants and small children, they do not fully protect the head area of an infant or child in the event of a serious wreck or vehicle crash. Simply put, for the most part, the head area of a child situated in a child restraint seat is exposed.

In addition, another problem or concern with child restraint seats is the fact that while strapped in the child restraint seat, a child can be exposed to a substantial amount of harmful sunshine. In those child restraint seat designs that the inventor is aware of, there is no provision for shielding the sun from the child, especially about the face area.

Therefore, there has been and continues to be a need for a safety shield for a child restraint seat that not only protects the child and especially the head area of a child, but also provides means for protecting the child from the sun.

SUMMARY AND OBJECTS OF THE INVENTION

The present invention entails a upper safety shield for a child restraint seat that includes an outer transparent housing and an inner sun shield that is moveable from a retracted non-operative position to an operative position where the sun shield protects a child situated in the child restraint seat from sun. In particular, the upper safety shield is adapted to be secured to a top portion of the child restraint seat and extends over the seat structure such that the infant's or child's head underlies the safety shield and tends to protect the head area from impact due to an automobile accident.

It is therefore an object of the present invention to provide a safety shield for a child restraint seat that is effective to protect the head of an infant or small child situated in the seat.

Another object of the present invention resides in the provision of a safety shield structure that is designed to protect the infant or child from the sun.

Another object of the present invention resides in the provision of a safety shield designed to attach to the upper portion of a child restraint seat that includes both a transparent shield structure and a sun shield for protecting an infant or a child situated in the child restraint seat from the sun.

A further object of the present invention is to incorporate select amenities into the safety shield device of the present invention including a music box, light, and a compartment for various articles such as facial tissue, etc.

Another object of the present invention is to provide a safety seal for a child restraint seat of the character referred to above that is relatively simple in design, easy to mount to a child restraint seat, and which is durable and reliable.

Other objects and advantages of the present invention will become apparent and obvious from a study of the following description and the accompanying drawings which are merely illustrative of such invention.

DESCRIPTION OF THE INVENTION

Figure 1:
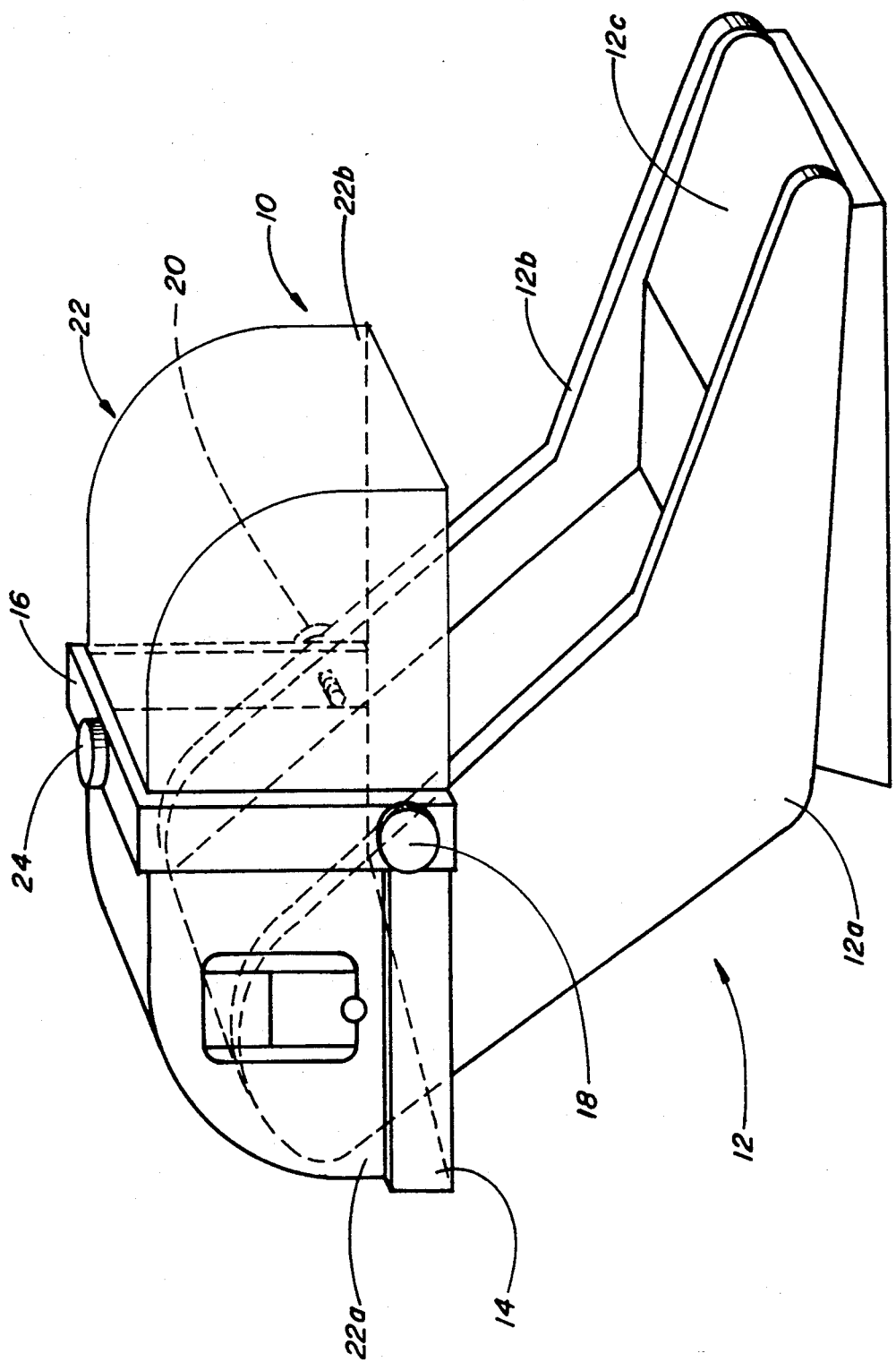
FIG. 1 is a perspective view of a child restraint seat with the safety shield of the present invention mounted thereon.
Figure 2:
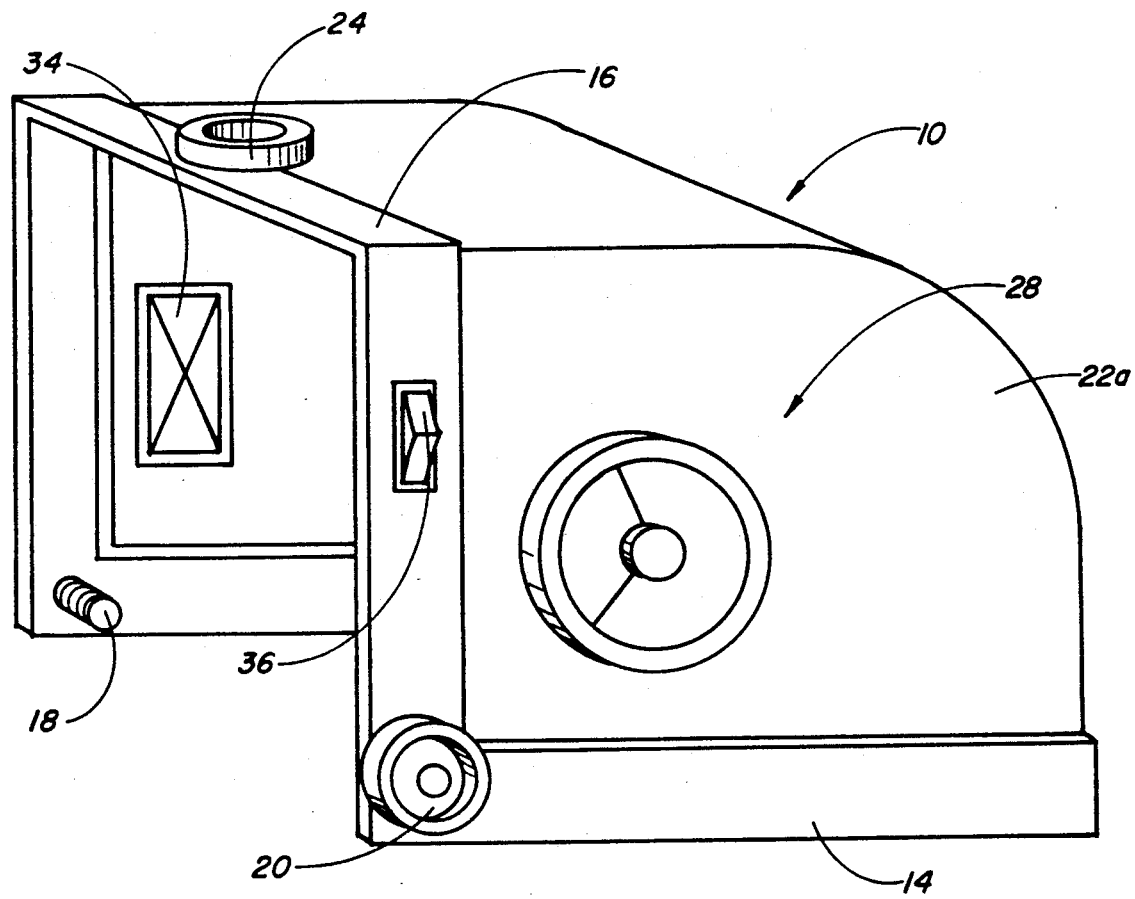
FIG. 2 is a perspective view of the shield structure with the forward portion of the transparent shield being retracted into the rear section.
Figure 3:
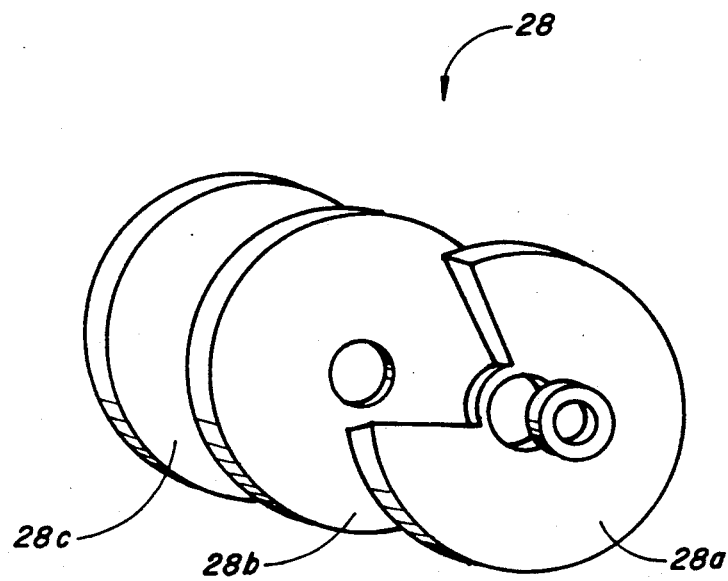
FIG. 3 is an exploded perspective view of the components of a rotating music box.
Figure 4:
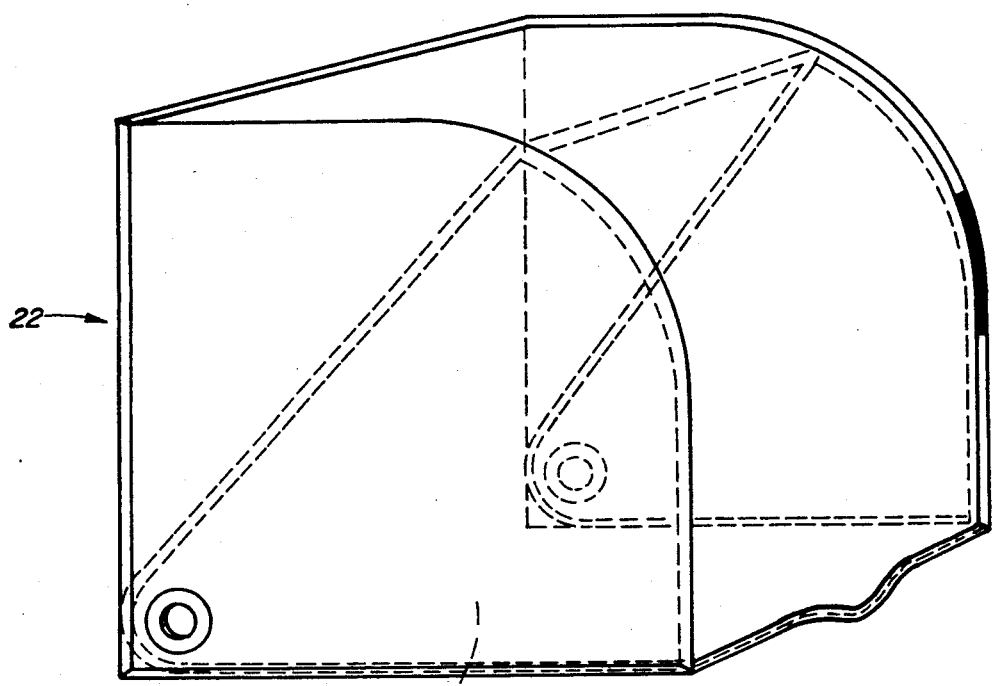
FIG. 4 is a fragmentary perspective view of a portion of a safety shield showing the inner sun shield.
Figure 5:
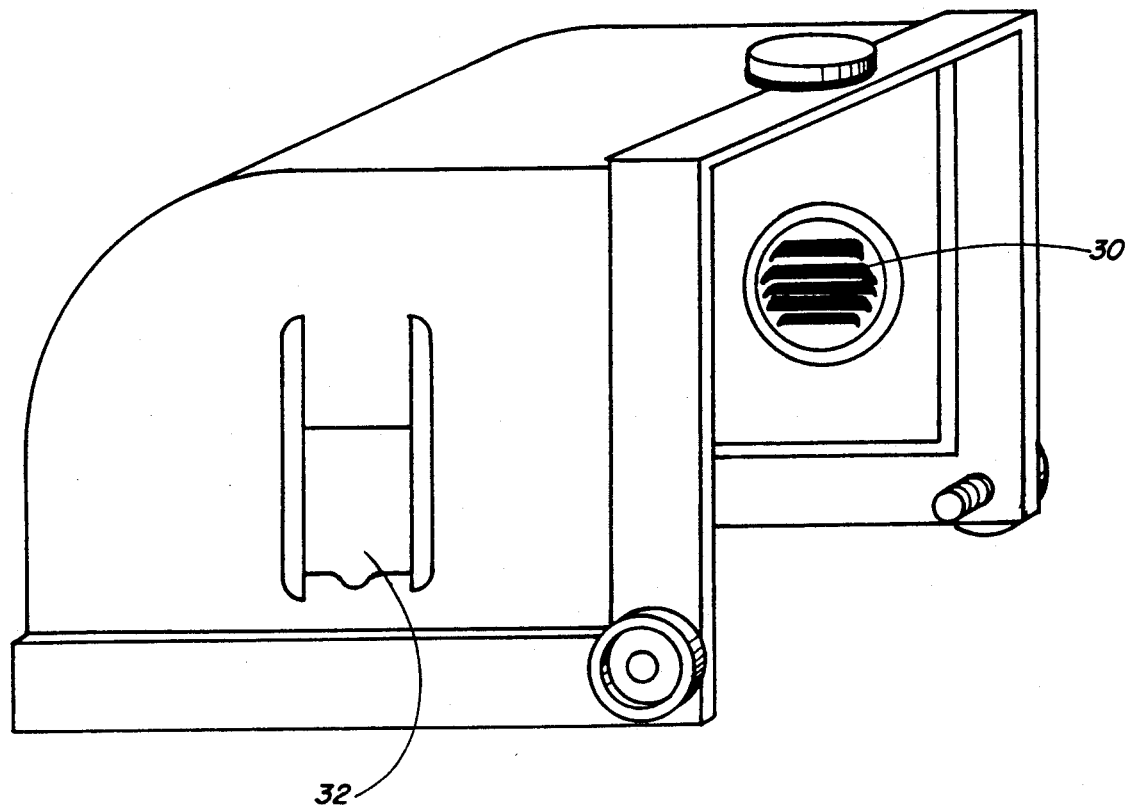
FIG. 5 is a perspective view of the safety shield of the present invention viewed from an angle opposite of that shown in FIG. 2.

With further reference to the drawings, the safety shield of the present invention is shown therein and indicated generally by the numeral 10. Safety shield 10 is designed and adapted to be mounted to a conventional child restraint seat indicated generally by the numeral 12 and particularly shown in FIG. 1. Note the child restraint seat 12 is of a conventional design and includes sides 12a, 12b and a central seating section 12c. As will be appreciated from subsequent portions of this disclosure, safety shield 10 is designed and adapted to mount directly to child restraint seat 12 and to extend over a top portion of the child restraint seat 12 such that an infant or child seated within the seat 12 is protected by the safety shield 10.

Viewing the safety shield 10 in more detail, it is seen that the same includes a basic frame structure that includes a rear horizontal frame 14 and a vertical U-shaped frame 16. Also forming a part of the frame structure is a pair of securing side screws 18 and 20. The side securing screws 18 and 20 are adapted to extend into the frame work of the child restraint seat 12 so as to secure the entire safety shield 10 to the restraint seat 12.

With reference to the safety shield structure 10, the same includes a pair of shields mounted within the frame structure just described. First there is a transparent shield indicated generally by the numeral 22. As seen in the drawings, transparent shield 22 is somewhat elongated and includes a rear section 22a and a forward section 22b. There is provided a stabilizing screw 24 that is secured to the upper portion of the vertical U-shaped frame 16 that secures and stabilizes the transparent shield 22 within the U-shaped frame 16.

Disposed internally of the transparent shield 22 is a sun shield 26. The sun shield 26 is movable within the transparent shield 22 such that it may move from a retracted non-operative position where it rests within the rear section 22a of the transparent shield to a forward extended position where it is housed within the forward section 22b. In this forward position, the sun shield 26 is operative to shield sunlight from the infant or child seated within the seat 12. Sun shield 26 is particularly effective in shielding the infant's or child's face.

The safety shield 10 of the present invention is provided with a number of support features such as a built-in music box 28. The music box 28 is of the disc type and includes an outer cover plate 28a, an inner music disc 28b and a turning player 28c. Disposed internally of the music box 28 is a speaker 30. Such music boxes are conventional and are commercially available.

In addition, the safety shield structure 10 includes a storage compartment 32 formed in the side wall thereof that permits the storage of tissue or the like.

Finally, the safety shield 10 includes a light 34 that can be provided on each side of the safety shield structure and wherein there is provided a switch 36 for controlling the light or lights.

From the foregoing specification and discussion, it is seen that the safety shield structure of the present invention is compatible with the child restraint seat 12 inasmuch as the safety shield structure forms an enclosed area that generally overlies the head of the infant or child seating in the child restraint seat. The safety shield 10 tends to protect the infant or child and in particularly acts as a protector for the delicate head of an infant or child. In addition, the sun shield 26 can be moved from an inoperative position to an operative position where it lies in the forward section 22b of the transparent shield. When disposed in this position, the sun shield 26 acts to shield the sun from the face and body area of the infant or child sitting in the seat.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. An upper safety shield for a child restraint seat comprising:
   a) a frame structure including means for attaching the upper safety shield to the child restraint seat;
   b) a shield assembly secured to the frame structure and extending over the child restraint seat, the shield assembly including an open area defined by a top and a surrounding wall with the open area being designed to generally overlie a child situated in the child restraint seat;
   c) the shield assembly including a transparent shield and a sun shield for shielding the child resting in the child restraint seat from the sun;
   d) means for moving the sun shield back and forth between a retracted non-operative position and an extended operative position and;
   e) wherein the transparent shield is disposed exteriorly of the sun shield and wherein the means for moving the sun shield back and forth between the retracted and extended positions result in the sun shield being moved interiorly of the outer transparent shield.

2. The upper safety shield for a child restraint seat of claim 1 including a music box incorporated into the safety shield structure.

3. The upper safety shield for a child restraint seat of claim 1 including a light secured within the upper safety shield.

4. The upper safety shield for a child restraint seat of claim 1 including a compartment formed in the upper safety shield for receiving and holding such items as tissue, napkins, etc.

* * * * *